United States Patent [19]

Turpin

[11] 4,415,014
[45] Nov. 15, 1983

[54] BEAD BREAKING TOOL

[76] Inventor: Eugene W. Turpin, 66 N. Academy, Sanger, Calif. 93657

[21] Appl. No.: 255,522

[22] Filed: Apr. 20, 1981

[51] Int. Cl.³ ............................................. B60C 25/06
[52] U.S. Cl. ................................................. 157/1.28
[58] Field of Search ...................... 157/1.17, 1.26, 1.28

[56] References Cited

U.S. PATENT DOCUMENTS

| | | | |
|---|---|---|---|
| 2,179,896 | 11/1939 | Neville | 157/1.28 |
| 2,660,229 | 11/1953 | Taylor | 157/1.17 |
| 2,701,010 | 2/1955 | Schafer | 157/1.17 |
| 2,771,941 | 11/1956 | Manupello | 157/1.17 |
| 2,900,016 | 8/1959 | Woodward | 157/1.17 |
| 3,865,172 | 2/1975 | Branick | 157/1.28 X |

*Primary Examiner*—James G. Smith
*Attorney, Agent, or Firm*—Huebner & Worrel

[57] ABSTRACT

A portable bead breaking tool for use with a large tire mounted in an operating position on a wheel rim, the tool having a frame which spans the tire and is adjustable for wheel rims of different widths, a pair of shoes mounted on the frame for individual engagement with the flanges of the rim; a clamp detachably mounted on either shoe to clamp the shoe to an engaged flange; a pusher assembly detachably mounted in either shoe having a blade which engages the bead of the tire adjacent to such flange; and a jack assembly detachably mounted on either shoe to urge the blade in a direction to break the bead from the flange.

10 Claims, 9 Drawing Figures

BEAD BREAKING TOOL

BACKGROUND OF THE INVENTION

1. Field of the Invention

The present invention relates to a bead breaking tool, and more particularly to such a tool transportable and usable in the field by one person to break the beads of even a large tire from a wheel rim while mounted in its operating position on a piece of equipment.

2. Description of the Prior Art

A relatively large force is required to break the bead of a large pneumatic tire, such as used on agricultural tractors and other heavy vehicular equipment, from the rim of a wheel on which the tire is mounted. Machines of relatively large size are, of course, available in the shop for mounting and demounting such tires. However, these machines are not portable and, in any event, require that the wheel and tire be removed from the piece of equipment on which they are used, a process requiring various tools and substantial effort by more than one person. It is uneconomical to take heavy and expensive equipment out of operation for removal of a wheel and even more uneconomical to move such equipment to the shop. With such a large tire, it is, therefore, usual to perform work such as repair of a punctured inner tube in the field, a bead of the tire being broken from the wheel rim by hammering. This method of bead breaking requires substantial effort, is somewhat dangerous, and is virtually impossible when the bead is adjacent to some obstruction or other portion of the equipment, for example, another tire of a pair of dual wheels. Since it is impossible to break a bead adjacent to such portion from a rim in the field with prior art equipment when repairing a punctured inner tube, only the bead opposite the portion can be broken from the rim. This allows a sufficient portion of the tube to be withdrawn for repair of the puncture but does not allow inspection of the tire interior. As a result, an object which caused the puncture may remain in the tire and cause a reoccurrence of the puncture.

PRIOR ART STATEMENT

In conformance with 37 C.F.R. §1.97 and §1.98, the applicant states that he is not aware of any prior art which is relevant to the patentability of the subject invention.

SUMMARY OF THE INVENTION

It is an object of the present invention to provide an improved portable bead breaking tool.

Another object is to provide such a tool which can be carried and operated by one person in the field to break the bead of a large tire from a wheel rim.

Another object is to provide such a tool adapted to break a tire bead from a wheel rim on which it is mounted even under conditions of restricted access.

Another object is to provide such a tool which is sufficiently light in weight to be conveniently carried by one person and which is durable and has sufficient strength to break the beads of a large tire from a wheel rim on which the tire is mounted.

Another object is to provide a tool having the foregoing advantages which is adapted for use with wheel rims of different widths.

Another object is to provide such a tool adapted to break both beads of a tire.

A further object is to provide improved elements and arrangements thereof in a portable bead breaking tool which is convenient, rapid, and safe to use and which is fully effective in performing its intended purposes.

DESCRIPTION OF THE PREFERRED EMBODIMENT

Referring with greater particularity to the drawings, a portable bead breaking tool 10 which embodies the principles of the present invention is shown mounted on a fragmentarily represented wheel rim 12 having a fragmentarily represented tire 14 mounted thereon. The rim and the tire are sectioned, substantially in a diametrical plane, and are mounted on a piece of equipment which includes a fragmentarily depicted portion 16. This portion is represented as one of a pair of dual wheels which also includes a wheel having the rim 12 and tire 14. The portion is adjacent to the rim and the tire and impedes access by the tool to one side thereof. Such tires and rims are, typically, of large size and are for use on agricultural tractors and earth moving equipment.

Figure 1:
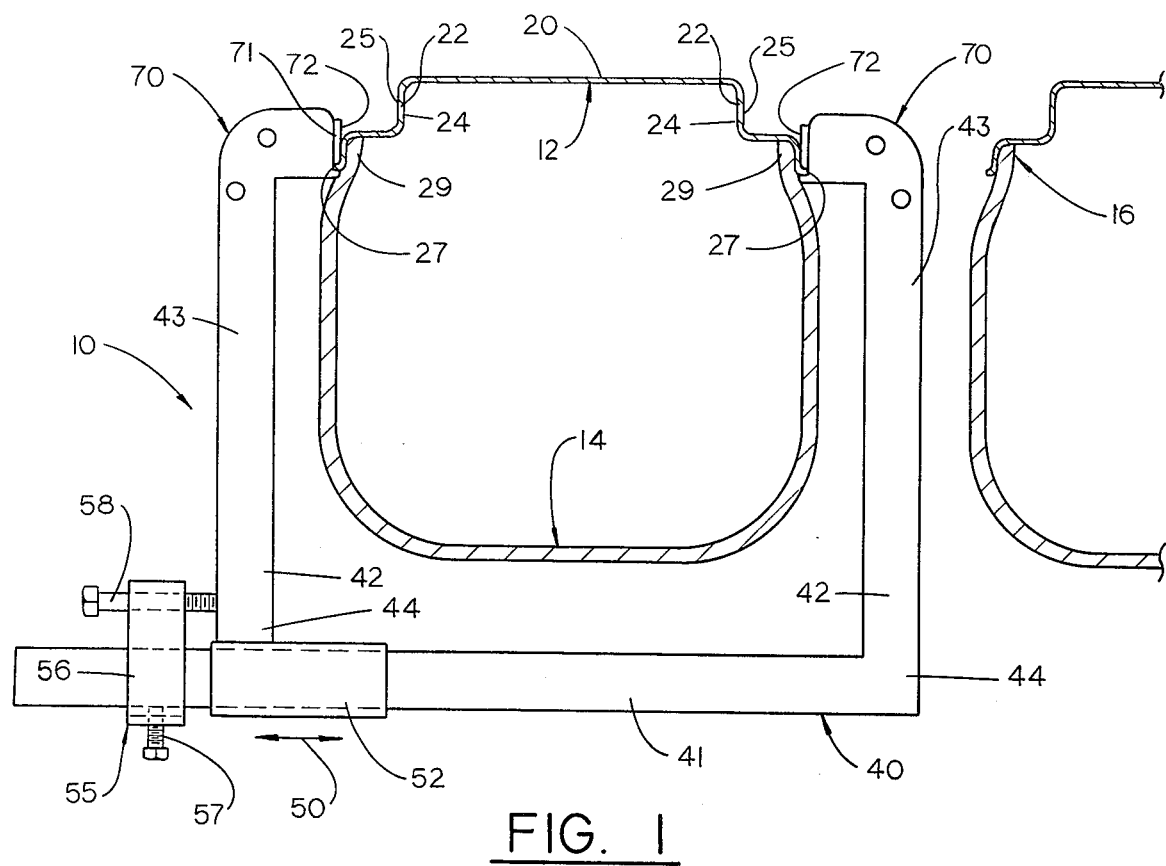
FIG. 1 is a plan view of a portable bead breaking tool of the present invention mounted on a wheel rim having a tire mounted thereon, detachable elements of the tool being omitted for clarity and the rim and tire being fragmentarily represented in diametrical section in an environment providing restricted access.

The rim 12 and tire 14 are of the usual construction. The rim has a center 20 which is cylindrical, having an axis which is disposed in a direction upwardly from the rim as it is represented in FIG. 1. The axially central portion of the center is somewhat smaller in diameter than its end portions. The rim has a pair of substantially identical annular flanges 22 individual to the end portions of the center and extended outwardly therefrom. Axially, the flanges are disposed in spaced disposition and face in opposite directions. Each flange has an inner side or face 24 disposed toward the center of the rim and toward the other flange and has an opposite outer side or face 25 disposed axially outwardly of the rim. Each flange extends radially from the center and then turns axially outwardly therefrom, terminating in an annular edge 27. The tire has a pair of axially spaced opposite side walls which terminate individually in circular beads 29 which are disposed between the flanges. When the tire is in use the beads are individually and firmly engaged axially with the inner sides of the flanges in conforming relation thereto and, centrally, are tightly engaged with the end portions of the center. It is apparent that each bead is disengageable from the rim by moving the bead axially away from the corresponding flange toward the other flange to a position over the central portion of the center. Conventionally this is usually accomplished by hammering on the side of the tire.

The tool 10 has a frame 40 which is generally U-shaped, having a center portion or bar 41 and a pair of opposite arms 42 which are interconnected by the bar and extend therefrom to individual distal ends 43, the arms having opposite ends 44 disposed at the bar. The bar is substantially longer than the axial thickness of the rim 12 and the tire 14, and the arms are substantially longer than the radial distance from the flanges 22 to the periphery of the tire. The frame is thus configured to assume a disposition shown in FIG. 1 in which the frame spans the tire axially and outwardly of the rim in a plane generally diametrically related to the tire and the rim. In this disposition the arms extend generally radially outwardly of the tire from the distal ends 43, each end being disposed somewhat axially and radially outwardly of a corresponding outer side 25 of the flanges.

One of the arms 42 is fixedly connected at its end 44 to the bar 41, and the other bar is slidably connected to the bar for movement therealong, indicated by the arrows 50, in a direction axially of the rim 12 when the frame 40 is in the disposition shown in FIG. 1. It is apparent that this movement provides for relative movement of the distal ends 43 toward and from each other and toward and from the flanges 22, so that the frame is adjustable to span different rims having flanges spaced different distances. The slidable connection is provided by a sleeve 52 secured to one of the movable arms at its end 44 and slidably fitted about the bar. The frame includes a clamp 55 which has a collar 56 slidably fitted about the bar adjacent to the sleeve and disposed oppositely thereof from the tire. The clamp has a locking screw 57 which is screwthreadably extended through the collar toward the bar and which is provided with a head opposite thereof. The clamp also has a tightening screw 58 which is screwthreadably extended through the collar toward the movable arm and is provided with a head opposite this arm.

Figure 9:
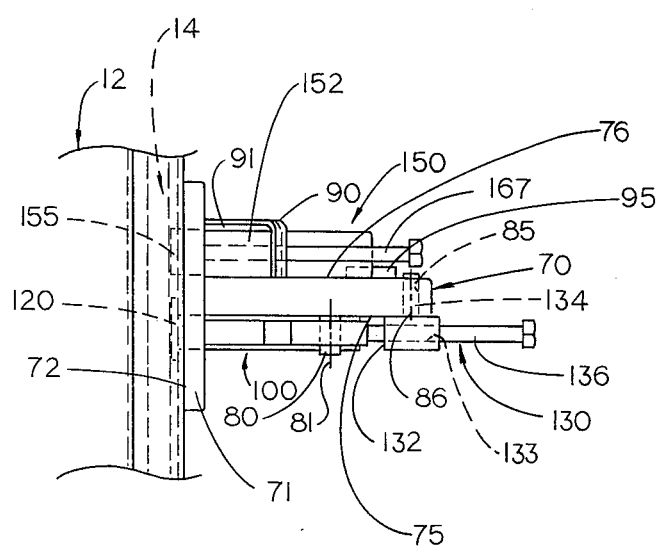
FIG. 9 is a fragmentary sectional view of the tool, including the pusher assembly and the clamp, taken from the position of line 9—9 of FIG. 6.

The tool 10 has a pair of unitary shoes 70, best shown in FIGS. 1 and 9, individually fixedly mounted on the distal ends 43 of the arms 42 for movement therewith. Each shoe has an L-shaped portion which extends from the corresponding distal end and turns toward the outer side 25 of the corresponding flange 22 when the frame 40 is disposed in relation to the rim 12 as shown in FIG. 1. The shoe has a portion 71 disposed inwardly of the edge 27 of the rim and adapted to extend in opposite directions circumferentially of the rim from the L-shaped portion. This portion is provided with a notch to receive the edge of the rim. It is apparent that the shoes thus have engaging surfaces 72 which face each other and which conform individually to the outer sides of the flanges. When the frame is disposed in relation to the rim as shown in FIG. 1, these surfaces are engageable individually with the outer sides oppositely of the beads 29 by the movement of the arms 42 together as provided by the slidable movement of the sleeve 52 along the bar 41. In this disposition, such movement carries the surface of the movable one of the arms toward and from the flange opposite thereto when the surface of the other arm is in conforming engagement with this opposite flange. The shoes have individual first sides 75 which face the same direction circumferentially of the rim when their respective surfaces 72 are engaged with the outer sides thereof. The shoes, which have substantially identical dimensions, are thus mirror images of each other. The shoes have individual second sides 76 which are opposite their respective first sides.

The first side 75 of each shoe 70 has a first mount or cylindrical pin 80 secured thereto and extended from the first side oppositely of the second side 76 about a first or link axis 81 which is substantially parallel to a diameter of the rim 12 when the engaging surface 72 of the shoe is conformingly engaged with an outer side 25 of the rim. It is apparent that, for an element suitably fitted to the pin and subsequently to be described, the pin provides pivotal movement about the axis and slidable movement therealong toward and from the first side. The pin is disposed so that its axis is aligned radially of the rim with an outer side so engaged and so that the axis is adjacent to the such engaged side and is spaced therefrom axially of the rim and oppositely of the surface engaged with the side. The shoe has a second mount or cylindrical bore 85 extended through it about a second axis 86. The second axis is substantially parallel to the first axis and is spaced therefrom in a direction radially outwardly of a flange so engaged. It is apparent that the bore provides, for another element which is subsequently to be described and is slidably fitted to the bore and insertable therein in a direction from the first side toward the second side, pivotal movement about the second axis and slidable movement therealong toward and from the first side.

Figure 4:
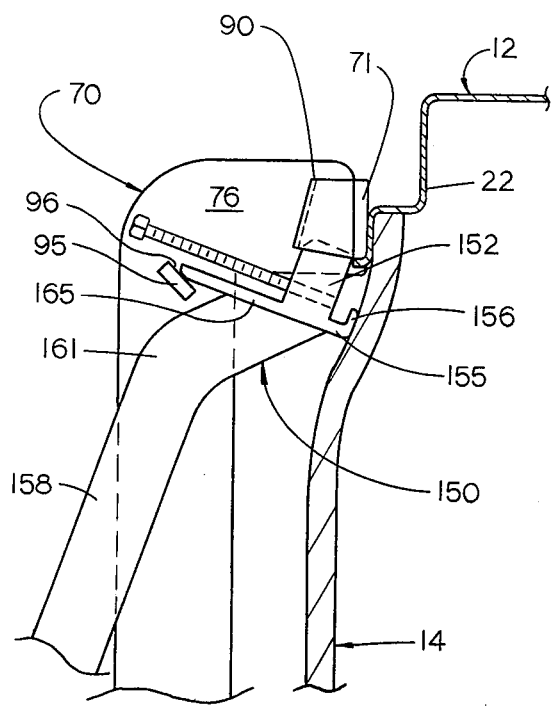
FIG. 4 is a view similar to FIG. 2 depicting the opposite side of the shoe together with a clamp of the tool, a lever of the clamp being fragmentarily represented.

Each shoe 70, as best shown in FIGS. 1, 4, and 9, has an L-shaped loop 90 fixedly mounted on its second side 76 adjacent to its portion 71. The loop is configured to define a generally rectangular opening 91 extended through the shoe in a direction generally along the coresponding arm 42 of the frame 40. The opening is adjacent to the engaging surface 72 of the shoe in a direction opposite of the surface from a flange 22 engaged thereby. The side of the opening opposite the engaging surface converges theretoward in a direction opposite of the arm, and this side of the opening is provided with a notch 93 disposed toward the arm. Each second side is provided with a lug 95 extended therefrom between the axes 81 and 86, the lug having a planar surface 96 which faces toward the loop.

The tool 10 has a pusher assembly 100 which is best shown in FIGS. 3, 6, 8, and 9 and is selectively and detachably mountable on the first side 75 of either one of the shoes 70. The assembly has a link 102 having opposite ends 103. One of the ends is provided with a first bore 104 which is fitted to the pins 80 for pivotal movement individually about their axes 81 and for axially slidable movement individually therealong. Movement of the assembly toward a first side serves to mount the assembly on the corresponding shoe and movement from the first side serves to detach the assembly therefrom. The link extends from the one end generally radially outwardly of a rim 12 engaged by the shoe and generally toward the second axis 86 thereof. The opposite end of the link is thus disposed radially outwardly of the edge 27 of such rim so that this opposite end moves generally axially of the rim in an arc extending oppositely of the second axis. The link has an approximately hemispherical socket 105 disposed towards its opposite end in facing relation to the second axis. The link has a second bore 107 extending through it about an arm axis 108 which is parallel to the first bore 104. The second bore is adjacent to the socket and is spaced therefrom somewhat toward the first bore.

The assembly 100 has an arm 110 having an end through which the arm axis 108 extends. The arm extends from this end toward the engaging surface 72 of a shoe 70 on which the arm is mounted in a direction, which is generally axially of a flange 22 engaged by the surface, to an opposite end of the arm. This opposite end is disposed in outwardly adjacent relation to the annular edge 27 of such flange when the link 202 is pivoted in a direction opposite of the axis 86 from the flange. The end of the arm at the arm axis is bifurcated and embraces the link. This end is pivotally fastened in the bore 107 in any suitable manner for movement of the arm about the arm axis. The opposite end of the arm is thus guided to move in a first path 115, which extends generally radially of such flange and is directed between the flange and a bead 29 engaged therewith, while the entire arm is guided by the link 102 in a second path 116 extending generally axially of the rim. The arm is of arched configuration and is concave toward such flange so as not to engage the edge 27 thereof as the link pivots about the axis 81. The arm is provided with a lever-like projection or block 118 extended from the convex side of the arm oppositely from its concave side and generaly along an arm 42 of the frame 40.

Figure 3:
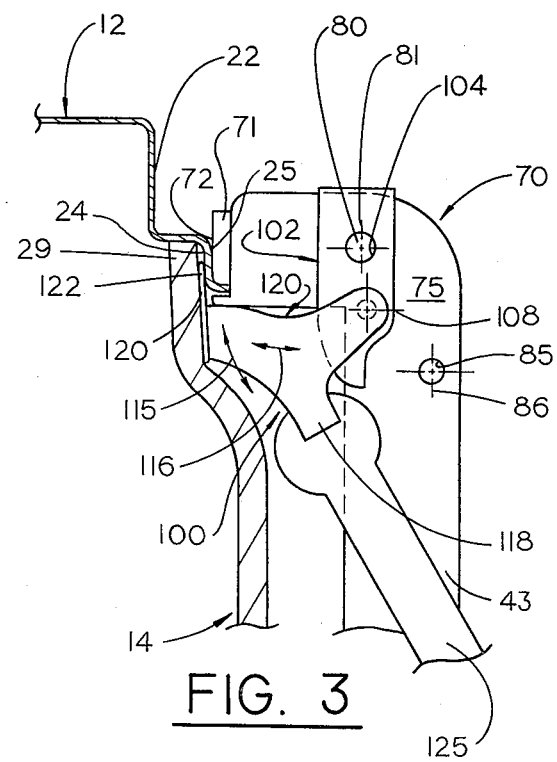
FIG. 3 is a view similar to FIG. 2 with the assembly in a successive position from that of FIG. 2 and grasped by a lever having a portion broken away for illustrative convenience.

The pusher assembly 100 has a blade 120 rigidly mounted on the arm 110 at the end thereof opposite of the arm axis 108. The arm thus extends from the blade to the link in a direction generally axially of a rim 12 having a flange 22 engaged by a surface 72 adjacent to the blade. It is apparent that the blade is guided along the first path 115 by the link 102 and is guided simultaneously along the second path 116 by the arm. The blade is planar and is generally normal to the arm, and the arm is connected centrally to the blade in a direction circumferentially of such rim. The blade has a leading edge 122 spaced from the arm toward such a rim a distance somewhat greater than the difference in diameter of a flange and the adjacent portion of a center 20. The side of the leading edge toward the link is convexly curved. The blade is thus adapted for insertion between the inner side 24 of such flange and a bead 29 engaged with the side. Such insertion is accomplished by pivotal movement of the blade and the arm radially of the flange along the first path 115 in a direction toward the leading edge and toward the center of such rim. The leading edge is provided with a pair of notches 123, best shown in FIG. 8, extending oppositely outwardly of the edge from the arm. Each notch is fitted to one of the L-shaped portions of the shoes 70, one notch being disposed for engagement with this portion of one shoe when the pusher assembly is mounted thereon, and the other notch being disposed for similar engagement with the corresponding portion of the other shoe. Such engagement guides the blade laterally as its leading edge moves initially for insertion between a flange and the adjacent bead as shown in FIG. 3, the convex curve of the leading edge facilitating such insertion.

Figure 6:
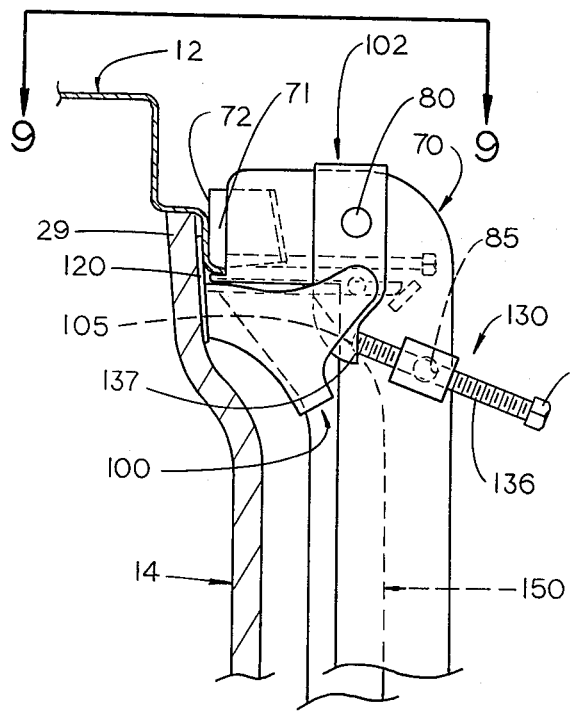
FIG. 6 is a view similar to FIG. 3 showing the tool with a jack assembly thereof engaging the pusher assembly.
Figure 7:
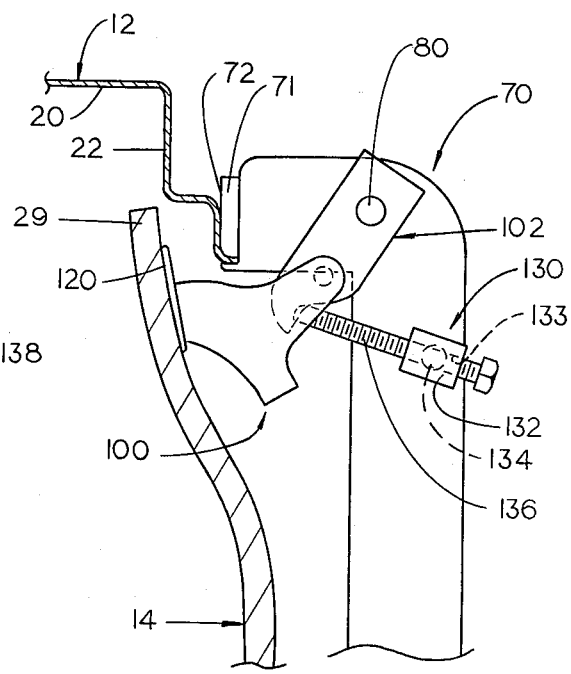
FIG. 7 is a view similar to FIG. 6 showing the assemblies in successive positions from those shown in FIG. 6.
Figure 8:
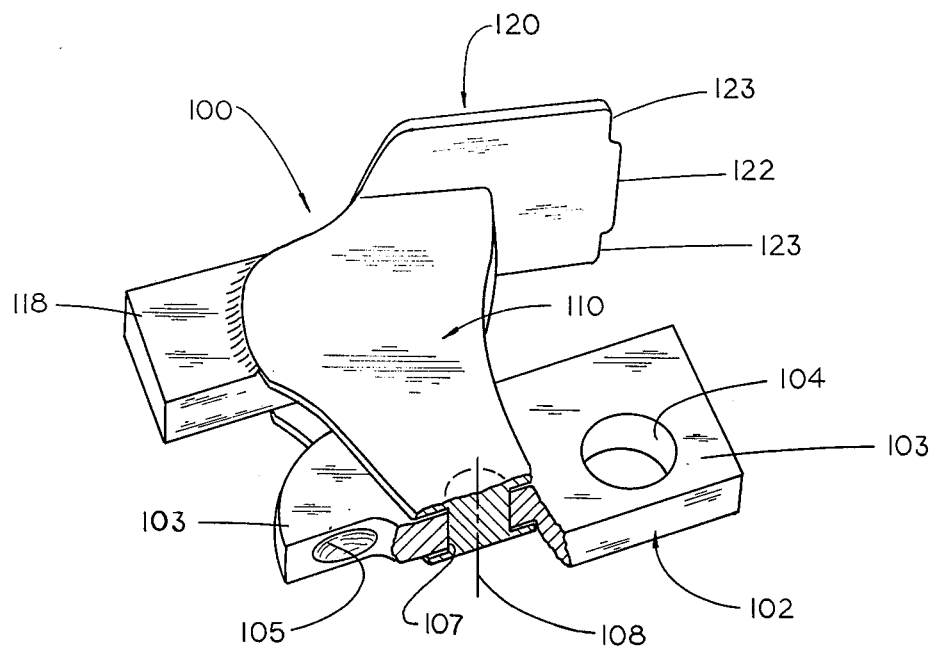
FIG. 8 is a perspective view of the pusher assembly at a further enlarged scale with a portion broken away to show interior construction.

The tool 10 is utilized with a wrench-like lever 125. This lever is depicted with different portions broken away in FIGS. 3 and 4 and is of any suitable construction adapted to grasp the block 118. The lever is manually graspable to pivot the arm 110 about the axis 108 for insertion of the blade 120 between a flange 22 and a bead 29 engaged therewith until the leading edge 122 contacts the center 20, as shown in FIG. 6. It is apparent that, with the blade so inserted, movement of the end 103 of the link through which such axis extends along the second path 116 toward the flange carries the arm and the blade along this path. The blade thus moves away from the flange and pushes the bead from the flange to break the engagement therebetween with the link serving to guide the arm and the blade along the second path for such disengaging movement. The dimensions and proportions of the elements of the pusher assembly are such that, when the blade has moved to the greatest extent possible along the second path away from the adjacent flange, the corresponding bead has moved therefrom to a point above the smaller diameter portion of the center, as shown in FIG. 7. The bead is then fully disengaged, both centrally and axially, from the rim.

The tool 10 has a jack assembly 130, best shown in FIGS. 7 and 9, selectively and detachably mountable on the first side 75 of either of the shoes 70 for urging the blade 120 along the second path 116, as just described, to break engagement between a flange 22 and a bead 29. The jack assembly is manually actuated and provides sufficient mechanical advantage to break such engagement even when a very large tire 14 is involved. This assembly has a first member or nut 132 of cubical shape. The nut has a screw-threaded bore 133 extended through it between an opposite pair of its faces and has a pin 134 extended normal to this bore centrally of another face. The pin is fitted to the bores 85 in the shoes 70 for pivotal movement invididually about the second axes 86 and for slidable movement individually therealong. Movement toward a first side serves to mount the jack assembly on the corresponding shoe and movement from this side serves to detach the assembly from the shoe. The second axis of a shoe on which the assembly is mounted thus extends through the nut and the screw-threaded bore therein so that the nut is pivotal relative to the shoe about this axis. When the jack assembly is so mounted on one of the shoes with the pusher assembly 100, the jack assembly is disposed adjacent to the link 102 and oppositely of the blade 120.

The jack assembly 130 has a second member or jack screw 136 mounted on the nut 132 and screwthreadably engaged with the bore 133. The screw extends axially in opposite directions from the bore, having a rounded end 137 fitted for reception in the socket 105 and an opposite end having a head 138 graspable for manual rotation of the jack screw. It is apparent that this screw lies in a plane which extends generally along a first side 75 of a shoe 70 on which the assembly is mounted and that the plane extends through the socket 105 of the pusher assembly 100 when the assemblies are mounted on the same shoe. Pivoting of the nut about the second axis 86 to a suitable position directs the rounded end toward the socket so that rotation of the jack screw in opposite directions moves the screw toward and from the link 102. Rotation of the screw in a predetermined direction results in the rounded end moving axially of the screw into engagement with the socket, and further such rotation moves the link 102, the arm 110, and the blade 120 along the second path 116 to break a bead 29 from a flange 22 as previously described. As the link pivots about the first axis 81 during such movement, as best shown in FIGS. 6 and 7, the nut pivots relative to the shoe about the second axis so that the rounded end of the jack screw remains in engagement with the socket. It is apparent that the jack assembly thus serves to urge the link to pivot toward an adjacent flange and that the pusher assembly moves axially of the rim 12 in a direction from such flange toward the center 20 as a bead is broken from the flange.

Figure 5:
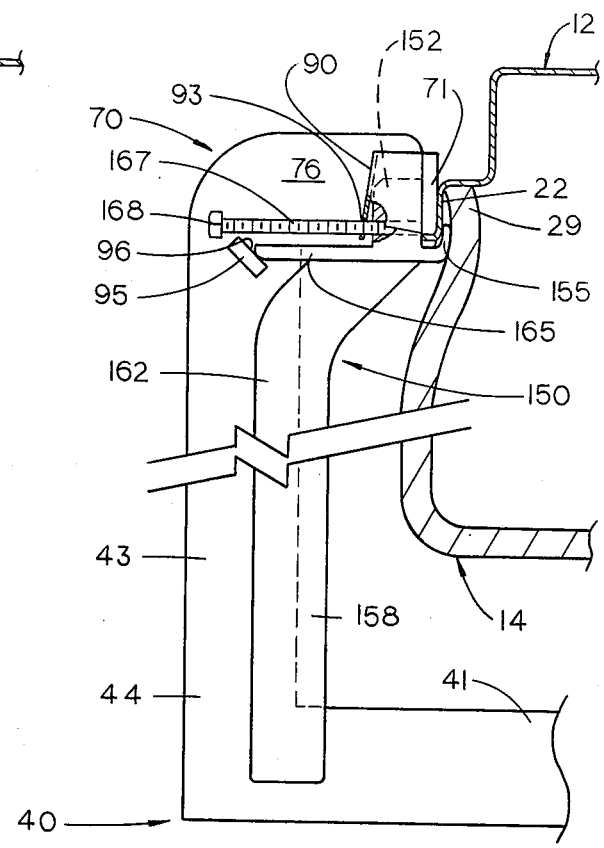
FIG. 5 is a view similar to FIG. 3 with the clamp in a successive position from that of FIG. 4 and with portions of the tool broken away for illustrative convenience.

The tool 10 includes a unitary clamp 150, best shown in FIGS. 4, 5, and 9, for releasably clamping a selected one of the shoes 70 to the rim 12 when the engaging surface 72 of the shoe is conformingly engaged with a side 25 of one of the flanges 22. The clamp has a projection 152 of generally rectangular cross-section which is loosely fitted to the openings 91 in the shoes. The projection is adapted to be inserted into each opening in a direction generally radially inwardly of such a flange to mount the clamp on a selected shoe, movement of the clamp in the opposite direction serving to detach the clamp from the shoe. The projection has a planar side which is disposed toward the portion 71 of a shoe when the projection is fully inserted in the opening. The side of the projection opposite the planar side is beveled to facilitate such insertion and to allow the clamp to pivot on the shoe for movement about an axis which is parallel to the axis 81 and is adjacent to a flange so engaged, engagement of this opposite side and the loop 90 providing a fulcrum for the clamp as the clamp is rocked about such an axis. The clamp has a hook 155 which is fixed to the projection and extends from it to a distal end 156. The hook is dimensioned and proportioned so that, when the planar side of the projection and a portion 71 of a shoe are engaged, the hook extends over this portion and over a flange engaged therewith with the distal end disposed oppositely of the flange from the planar side. The hook is thus insertable between the inner side 24 of such flange and adjacent bead 29, as shown in FIG. 5, the distal end being tapered so as to facilitate such insertion. The clamp has a lever 158 which extends from the hook and the projection in a direction generally along an arm 42 corresponding to the opening 91 in which the projection is inserted. The lever extends substantially to the center bar 41 and is thus graspable to pivot the clamp in the opening so that the hook moves between a first position 161, which is shown in FIG. 4 and in which the distal end is radially outwardly of the flange, and a second position 162, shown in FIG. 5, in which the distal portion is inserted between the flange and the bead.

The clamp 150 has an arm 165 extended from the projection 152 oppositely of the hook 155 and adapted to engage the surface 96 when the clamp attains its second position 162 as the clamp is pivoted theretoward from the first position 161. The clamp is provided with a retaining screw 167 which extends through the projection and is screwthreadably engaged therewith for axial movement in a direction toward and from the distal end 156. The screw thus has an end, which is disposed to the circumferentially extending portion 71 of a shoe 70 through the opening 91 of which the projection is inserted, and has a head 168 disposed oppositely of the projection from this end. It is apparent that, when the clamp is in the second position, rotation of the screw so as to engage its end with the circumferentially extending portion secures the hook to the shoe, while rotation of the screw in the opposite direction releases the hook from the shoe.

OPERATION

The operation of the described embodiment of the subject invention is believed to be clearly apparent and is briefly described at this point. To break a bead 29 of a tire 14 from a rim 12 with the tool 10, the frame 40 is disposed in relation to the rim as depicted in FIG. 1. Initially, the one of the arms 42 which is fixed to the bar 41 is moved radially of the rim and the corresponding engaging surface 72 conformingly engaged with the outer side 25 of one of the flanges 22. It is apparent that, when the flange is axially adjacent to a portion 16 of a vehicle, relatively little clearance is required between the flange and the portion for extension of the arm therebetween. The sleeve 52 is then slid along the bar and the engaging surface corresponding to the movable arm is engaged with the outer side of the other flange. The collar 56 is then slid along the bar toward the movable arm and secured to the bar in a position adjacent to this arm by tightening the locking screw 57 against the bar. The tightening screw 58 is next rotated to move it against the movable arm, urging the arm and its shoe against the rim and firmly clamping the engaging surfaces individually against the flanges oppositely of the beads, thereby retaining the shoes with these surfaces so positioned. It is apparent that the clamp 55 serves to clamp the arm at a selected position of its movement along the bar. It is also apparent that the position can be varied to adapt the frame to span rims having their respective flanges spaced axially different distances.

Figure 2:
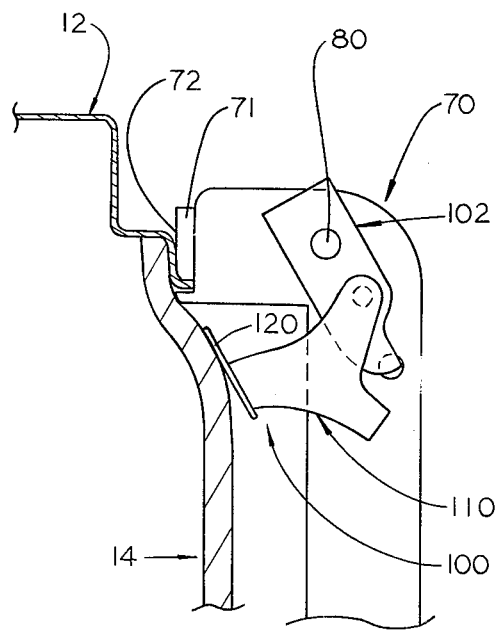
FIG. 2 is a somewhat enlarged fragmentary plan view of the tool showing a pusher assembly and one side of a shoe of the tool together with fragmentary portions of the rim and tire.

When the frame 40 and shoes 70 are clamped to the rim 12, the pusher assembly 100 is mounted, as shown in FIG. 2, on the shoe 70 adjacent to a bead 29 which is to be broken from the flange 22 engaged thereby. The link 102 is pivoted away from the tire 14 sufficiently to allow the blade 120 to move past the tire in a direction along the axis 81 until the assembly engages the first side 75 of the shoe, and the assembly is mounted by fitting the bore 107 over the pin 80. The link is then pivoted to a position, shown in FIG. 3, in which the blade engages the tire; the block 118 grasped by the lever 125; and the lever urged manually toward the tire. As a result, the arm 110 and the blade are pivoted about the axis 108, inserting the blade between the adjacent bead and the adjacent inner side 24 of the flange.

It is apparent that, with the blade 120 so inserted, movement of the blade axially of the rim 12 toward its center 20 and away from the shoe 70 on which the assembly 100 is mounted pushes the bead 29 engaged by the blade from the adjacent flange. It is also apparent that, as the blade forces the bead from this flange, a reaction force axially of the rim is transferred to this shoe from the pusher assembly 100 in a direction to urge this shoe away from the opposite shoe. Such a reaction force would tend to bend the frame 40, and it is apparent that the frame can be lightened for convenience in carrying if it is not subjected to such bending. The tool, therefore, includes the clamp 150 to connect the shoe directly to the rim.

As is apparent from FIG. 4, the projection 152 of the clamp 150 is insertable into the opening 91 of a shoe 70 on which the pusher assembly 100 is mounted by moving the clamp generally radially toward the rim 12 with the hook 155 in its first position 161. When the projection is received in the opening, the lever 158 is grasped manually and moved toward the tire and the position shown in FIG. 5. The clamp is thus pivoted about an axis generally parallel to the axes 81 and 86, bringing the hook 155 into its second position 162 with the distal end 156 inserted between the bead 29 and the flange 22 which are adjacent to the opening. As a result, the hook is engaged with the flange and clamps the flange to the shoe, the relation of the shoe, pusher assembly, and clamp then being as shown in FIG. 9. The screw 167 is next rotated so that it is tightly engaged with the portion 71 of the shoe to retain the hook in its second position. It is apparent that, with the hook in this position, the above described reaction force transferred to the shoe by the pusher assembly is substantially transferred from the shoe to the projection 152, through the clamp to the hook 155, and from the distal end 156 thereof to the side 24 of the flange 22 from which a bead is being pushed. The frame 40 is thus not extensively subjected to such reaction force.

When the shoe 70 mounting the pusher assembly 100 is clamped to the adjacent flange 22, as just described, the jack assembly 130 is mounted on the shoe, as shown in FIG. 6. The jack assembly is mounted by inserting the pin 134 in a direction toward the first side 75 of the shoe into the bore 85 of the shoe until the nut 132 engages the first side. The nut is then pivoted about the axis 86 until the end 137 of the jack screw 136 is directed toward the socket 105, and the jack screw rotated until this end is received in the socket. Continued rotation of the jack screw causes the pusher assembly to assume the position depicted in FIG. 7 in which the bead 29 has been pushed over the center 20 of the rim and is fully disengaged from the flange.

When one of the beads 29 is broken from the corresponding flange 22, as just described, the jack screw 136 is rotated to free its end 137 from the socket 105. The jack assembly 130 and the pusher assembly 100 are detached from the one of the shoes 70 corresponding to the one bead by moving the assemblies away from the first side 75 of the shoe individually along the corresponding one of the axes 81 and 86. The screw 167 of the clamp 150 is loosened and the clamp detached from the shoe by withdrawing the projection 152 from the opening 91. If it is desired to break the other bead from its flange, the pusher assembly, the clamp, and the jack assembly are then transferred to the other shoe and utilized substantially in the manner described to break this other bead. Since the tool 10 only requires sufficient space axially of the tire between it and an adjacent portion 16 of a vehicle to pivot the levers 125 and 158, it is apparent that both beads can be broken although the rim is mounted in its operating position on the vehicle. When the beads are broken, the locking screw 57 is loosened and the movable one of the arms 42 slid away from the tire 14 to release the frame 40 from the rim and free the tool 10 for further use.

Since the frame 40 is not significantly subjected to the reaction force developed by the pusher asssembly 100 in pushing a bead 29 from a flange 22, the frame is relatively light in weight and is easily carried in the field by one person. The detachable mounting of the pusher assembly, the jack assembly 130, and the clamp 150 on either of the shoes further reduces the weight of the tool since only one of each of these three elements is required for breaking both beads. The frame is also easier to manipulate since these elements may be detached while the frame is mounted on a rim. Although the tool is relatively light, the jack assembly 130 provides sufficient mechanical advantage so that one person can break from a rim 12 the bead of a tire of large size. As before stated, the movable mounting of one of the arms 42 by the sleeve 52 to the bar 41 adapts the tool for use with wheel rims having the flanges spaced different distances. The tool requires relatively little space axially of a tire and is thus adapted to break from a rim a bead adjacent to a portion, such as by the portion 16, of a piece of equipment.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A bead breaking tool for mounting releasably on a wheel rim which has a pair of annular, axially spaced flanges and is provided with a tire having a pair of beads disposed between the flanges and individually engaged therewith, the tool comprising:
   A. a pair of shoes individually fitted to the flanges outwardly of the beads;
   B. A frame extended between the shoes and secured individually thereto to retain the shoes in a disposition wherein each shoe engages the corresponding flange oppositely of the beads, the frame being shaped to span the tire outwardly of the rim when the shoes are engaged with the flanges;
   C. a blade insertable between one of the flanges and the one of the beads engaged therewith;
   D. means mounted on the one of the shoes engaged with the one flange for guiding the blade in a first path generally radially of the rim between the one flange and the one bead to insert the blade therebetween;
   E. means mounted on the one shoe for guiding the blade in a second path generally axially of the rim with the blade inserted between the one flange and the one bead; and
   F. means for urging the blade along the second path away from the one flange and pushing the one bead axially from said flange to break engagement therebetween, said means for urging the blade along the second path being mounted on the one shoe and transferring thereto a reaction force from said pushing; and
   G. means for releasably clamping the one shoe to the one flange and for transferring the force from the shoe to the flanges so that force is not exerted on the frame.

2. A bead breaking tool for mounting releasably on a wheel rim which has a pair of annular, axially spaced flanges and is provided with a tire having a pair of beads disposed between the flanges and individually engaged therewith, the tool comprising:
   A. a pair of shoes individually fitted to the flanges outwardly of the beads;
   B. a frame extended between the shoes and secured individually thereto to retain the shoes in a disposition wherein each shoe engages the corresponding flange oppositely of the beads, the frame being shaped to span the tire outwardly of the rim when the shoes are engaged with the flanges;
   C. a blade insertable between one of the flanges and the one of the beads engaged therewith;

D. an arm secured to the blade and extended generally axially away from the rim to an end of the arm spaced from the blade, the arm being mounted on the one of the shoes engaged with the one flange so as to guide the blade in a first path generally radially of the rim between the one flange and the one bead to insert the blade therebetween;

E. a link having an end pivotally connected to the end of the arm for movement about an arm axis and having an opposite end, the link being mounted on the one shoe so as to guide the blade in a second path generally axially of the rim with the blade inserted between the one flange and the one bead, the arm axis being generally parallel to a diameter of the rim when the one shoe is engaged with the one flange and when the blade is moving along the second path;

F. a first jack member which is disposed adjacent to the link and oppositely thereof from the blade and a second jack member which is mounted on the first member for movement relative thereto from the link and toward the link, such movement toward the link engaging the second member therewith and moving the link toward the one bead so that the blade is urged along the second path away from the one flange and pushes the one bead axially from said flange to break engagement therebetween;

G. means mounting the link on the one shoe for pivotal movement of the link relative thereto about a link axis generally parallel to the arm axis and extended through said opposite end; and H. means mounting the first jack member on the one shoe for pivotal movement about a jack axis generally parallel to the link axis and extended through the first member so that the first member pivots relative to the shoe as the second jack member moves toward the link and the second member remains engaged with the link as the link pivots about the link axis.

3. The tool of claim 2 wherein the means mounting the link on the shoe comprises a pin extended along the link axis connecting the link and shoe for axially slidable movement along the pin to detach the link, together with the arm and the blade, from the shoe and wherein the means mounting the first jack member on the shoe comprises a pin extended along the jack axis and connecting said member and the shoe for axially slidable movement along said pin to detach the first member and the second member from the shoe.

4. The tool of claim 2 wherein the frame includes
A. a pair of arms having individual distal ends individually secured to the shoes, each arm extending from the distal end thereof to an opposite end which is disposed generally radially outwardly of the rim from the shoe when the shoes are engaged with the flanges,
B. means connecting said opposite ends for relative movement of the shoes axially of the rim into engagement with the flanges so that the frame is adjustable to accommodate rims having flanges spaced different distances axially of the rim, and
C. means for selectively and releasably clamping the arms of positions along said movement individually corresponding to said different distances.

5. A bead breaking tool for use with a tire mounted on a wheel rim having a generally cylindrical center and an annular flange which extends outwardly of the center at one axial end thereof, the flange having one side disposed toward the center and an opposite side; the tire having a bead which is engaged axially with the one side and tightly engaged inwardly with the center; the bead being disengageable from the center by movement therealong in a direction away from the flange; and the tool comprising:

A. a shoe having a surface conforming to said opposite side of the flange;

B. means for clamping the shoe to the rim with the surface engaged with the opposite side and the shoe disposed axially thereof;

C. a pusher assembly having a link mounted on the shoe for pivotal movement relative thereto about an axis generally parallel to a diameter of the flange and spaced axially therefrom away from the center when the surface is engaged with the opposite side, the link extending generally radially outwardly of the rim from the axis, having a blade insertable between the bead and the one side, having an arm rigidly connected to the blade and extended therefrom toward the link, the arm being pivotally connected to the link for movement of the blade toward and from the center in a direction generally radially thereof, and having lever means graspable for urging the blade to pivot toward the center for insertion between the bead and the one side; and D. means mounted on the shoe for urging the link to pivot toward the flange when the blade is inserted between the bead and the one side so that the arm and the blade move axially of the rim in a direction from the flange toward the center and the blade pushes the bead in said direction, breaking the bead from the rim.

6. The tool of claim 5 wherein the rim has another flange which is spaced axially from said flange and which has a side disposed toward the center and an opposite side, wherein the tire extends axially between the centrally disposed sides of the flanges, and wherein the tool further comprises:

A. another shoe having a surface conforming to the opposite side of said another flange, and B. a generally U-shaped frame dimensioned to span the tire, the frame having a central portion extending axially of the tire and a pair of arms extended from the central portion individually to the shoes, the arms being connected to the corresponding shoes so that the respective surfaces thereof are disposed individually in conforming engagement with the opposite sides of the flanges.

7. The tool of claim 6 wherein one of the arms is connected to the central portion of the frame for movement of the surface of the one of the shoes connected to the one arm toward and from the opposite side of the flange to which said surface conforms when the surface of the other shoe is in conforming engagement with the opposite side of the other flange, and wherein the frame includes means for releasably clamping the one arm at a position along said movement whereat said surfaces are individually disposed in conforming engagement with the corresponding opposite sides of the flanges.

8. The tool of claim 5 wherein the clamping means comprises:

A. a hook having a distal portion and a pivotal connection to the shoe at a location thereon adjacent to the opposite side of the flange when the opposite side is engaged by the surface, the hook pivoting about the connection between a first position wherein the distal portion is outwardly of the flange and a second position wherein the distal portion extends between the bead and the one side and is engaged therewith;

B. a lever extended from the hook operable to urge the hook from the first position into the second position;

C. means for releasably securing the hook to the shoe in the second position so that a reaction force on the shoe due to pushing the bead in said direction is transferred from the shoe to the one side through the distal portion and so that the surface of the shoe remains engaged with the rim as the bead is broken.

9. A bead breaking tool for use with a wheel rim having a tire mounted thereon, the rim having a pair of annular, axially spaced flanges; each flange having an inner side facing the other flange and an opposite outer side; the tire having a pair of annular, axially spaced beads, each bead being individually tightly engaged with the inner side of one of the flanges and releasable therefrom by movement toward the other flange; and the tool comprising:

A. a generally U-shaped frame having a pair of opposite arms terminating in individual distal ends, the frame being adapted outwardly to span the tire in a plane generally diametrically thereof with the arms extending substantially radially of the rim and with the distal ends disposed in individually axially outwardly adjacent relation to the outer faces, one of the arms being connected to the other of the arms for adjustable movement of the distal end of the one arm toward and from the distal end of the other arm to accommodate the frame to such rims having flanges of different axial spacings, and the frame having means for releasably clamping the one arm in a selected position along such movement;

B. a pair of shoes individually fixedly mounted on the distal ends of the arms and having individual flange engaging surfaces facing each other and conforming to the outer sides of the flanges for engagement therewith to retain the frame onto the rim when the one arm is moved toward the other arm, the shoes having individual first sides which face in one direction circumferentially of the rim when the surfaces engage the outer sides and individual second sides which face in the opposite direction, each first side having first mounting means for defining a first axis and for providing pivotal movement thereabout and slidable movement therealong toward and from the first side, said axis being disposed so that, when the corresponding surface is engaged in conforming relation with an outer side of a flange, the axis is generally parallel to a diameter of the rim, is aligned radially thereof with said side, and is spaced axially therefrom oppositely of said surface and each first side having second mounting means for defining a second axis and providing for pivotal movement thereabout and slidable movement therealong, the second axis being generally parallel to the first axis and spaced therefrom radially outwardly of a flange so engaged;

C. a pusher assembly which includes a link having an end receivable on either of the first mounting means for pivotal movement of the link about the first axis thereof and for slidable movement of the assembly along said first axis toward the adjacent first side of a shoe, selectively to mount the assembly on the shoe, and from said side to detach the assembly from the shoe; having an opposite end disposed generally toward an adjacent second axis; having a socket disposed toward the opposite end and facing such axis; having an arm which is pivotally connected to said opposite end for movement about an axis generally parallel to the first axis and extended from said opposite end toward the adjacent engaging surface and which has a projection graphable to urge the arm to pivot for insertion of a blade between said inner side and said bead; and having said blade which is fixedly mounted on the arm and which is insertable between an adjacent inner side of a flange and a bead engaged therewith by pivotal movement of the arm toward the flange; and D. a jack assembly having a nut receivable on either of the second mounting means for pivotal movement of the nut about the second axis thereof and for slidable movment of the nut along said second axis toward the adjacent first side of a shoe, selectively to mount the jack assembly on the shoe adjacent to the pusher assembly when the pusher assembly is mounted on said first side, and for movement from the first side to detach the jack assembly from the shoe, and the jack assembly having a jack screw screwthreadably received in the nut for axial movement relative thereto in a plane which extends along an adjacent first side and through the socket of the pusher assembly, the jack screw having one end extended from the nut for reception in the socket when the nut is pivoted about said second axis to direct the one end toward the socket and having an opposite end extended oppositely from the nut and graspable to rotate the jack screw, so that, when the jack screw is rotated in a predetermined direction with the pusher assembly mounted adjacent thereto and the blade inserted between the flange and the bead adjacent to said assembly and the one end received in the socket, the one end moves axially toward the socket to move the arm and the blade axially of said flange so that the blade pushes said bead toward the other flange.

10. The tool of claim 9 wherein each shoe has an opening adjacent to the second side thereof, the opening extending through the shoe in a direction generally along the corresponding arm of the frame and adjacent to the engaging surface in a direction opposite thereof from a flange engaged thereby, and wherein the tool further comprises a clamp having a projection loosely fitted to the openings, the clamp being selectively mountable on either shoe by insertion of the projection in the opening thereof in a direction generally along the corresponding arm toward such engaged flange, being detachable from the shoe by movement of the clamp in a direction opposite said direction, and being pivotable about an axis generally parallel to a diameter of such engaged flange by rocking the clamp in the opening with the projection engaged in fulcruming relation with the shoe within the opening; the clamp having a hook fixedly connected to the projection and extending therefrom to a distal end of the hook insertable between the inner side of such engaged flange and a bead engaged with said side when the projection is received in the opening adjacent to such flange and the clamp is pivoted about said axis; and the clamp having a lever which is fixedly connected to the projection and which extends, when the projection is received in an opening, along the corresponding arm and is operable to pivot the clamp to insert the distal end between a bead and a flange which are adjacent to such opening and to engage the distal end with said adjacent flange, so that the shoe is clamped to said adjacent flange and so that a reaction force axially of the rim due to the blade pushing the bead toward the opposite flange is substantially transferred from the pusher assembly to the shoe, from the shoe to the projection of the clamp, and from the hook to said adjacent flange, whereby reaction force imposed on the frame is minimized.

* * * * *

UNITED STATES PATENT AND TRADEMARK OFFICE
CERTIFICATE OF CORRECTION

PATENT NO. : 4,415,014
DATED : November 15, 1983
INVENTOR(S) : Eugene W. Turpin

It is certified that error appears in the above-identified patent and that said Letters Patent are hereby corrected as shown below:

Column 4, line 47, delete "coresponding" and substitute ---corresponding---.

Column 5, line 20, delete "202" and substitute ---102---.

Column 11, line 64, delete "of" and substitute ---at---.

Column 14, line 10, delete "graphable" and substitute ---graspable---.

Signed and Sealed this

Thirteenth Day of March 1984

[SEAL]

Attest:

GERALD J. MOSSINGHOFF

Attesting Officer

Commissioner of Patents and Trademarks